(12) United States Patent
Kipnis et al.

(10) Patent No.: US 12,285,688 B2
(45) Date of Patent: Apr. 29, 2025

(54) NATURAL LANGUAGE DIALOG SYSTEM FOR COMPUTER PROGRAM INTERACTION

(71) Applicant: GOOGLE LLC, Mountain View, CA (US)

(72) Inventors: Anna Kipnis, San Bruno, CA (US); Robert J. Mical, Redwood City, CA (US); Steven Lee Pucci, Los Gatos, CA (US); Benjamin Pietrzak, San Francisco, CA (US); Rachel Bernstein, San Francisco, CA (US); Aaron D. Cohen, Newark, CA (US)

(73) Assignee: GOOGLE LLC, Mountain View, CA (US)

( * ) Notice: Subject to any disclaimer, the term of this patent is extended or adjusted under 35 U.S.C. 154(b) by 237 days.

(21) Appl. No.: 17/910,969

(22) PCT Filed: Apr. 15, 2020

(86) PCT No.: PCT/US2020/028286
§ 371 (c)(1),
(2) Date: Sep. 12, 2022

(87) PCT Pub. No.: WO2021/183156
PCT Pub. Date: Sep. 16, 2021

(65) Prior Publication Data
US 2023/0173392 A1 Jun. 8, 2023

Related U.S. Application Data

(60) Provisional application No. 62/988,942, filed on Mar. 13, 2020.

(51) Int. Cl.
*A63F 13/69* (2014.01)
*A63F 13/42* (2014.01)
(Continued)

(52) U.S. Cl.
CPC ............ *A63F 13/69* (2014.09); *A63F 13/424* (2014.09); *G06F 40/35* (2020.01)

(58) Field of Classification Search
CPC ........ A63F 13/69; A63F 13/424; A63F 13/42; G06F 40/35
(Continued)

(56) References Cited

U.S. PATENT DOCUMENTS

2014/0257793 A1 9/2014 Gandrabur et al.
2016/0179939 A1 6/2016 Levas et al.
(Continued)

FOREIGN PATENT DOCUMENTS

| CN | 109635130 A | 4/2019 |
|---|---|---|
| JP | 2001243245 A | 9/2001 |
| JP | 2015155932 A | 8/2015 |

OTHER PUBLICATIONS

Translation of Japanese Office Action mailed Aug. 8, 2023 for JP 2022-520301, 9 pages.
(Continued)

*Primary Examiner* — George C Monikang

(57) ABSTRACT

A video game system provides dialog responses based on a natural language model (NLM). The NLM is a language model that receives a language input, such as a dialog selection, audio recording, or natural language text input provided by a user of the video game system. In response to the language input, and based on a corpus of natural language candidate lines, the NLM identifies one or more potential responses. The video game system selects a final response from the identified potential responses and provides the selected response to the user via, for example, one or more display frames or via an audio output.

20 Claims, 4 Drawing Sheets

(51) Int. Cl.
  *A63F 13/424* (2014.01)
  *G06F 40/35* (2020.01)
(58) Field of Classification Search
  USPC .............................. 704/9, 231, 239, 240, 251
  See application file for complete search history.

(56) References Cited

U.S. PATENT DOCUMENTS

2018/0189267 A1* 7/2018 Takiel ..................... G10L 15/19
2018/0266531 A1   9/2018 Brown et al.
2019/0267028 A1   8/2019 Kawano et al.
2021/0211827 A1   7/2021 Takase et al.

OTHER PUBLICATIONS

International Preliminary Report on Patentability mailed Sep. 22, 2022 for corresponding International Application No. PCT/US2020/028286, 7 pages.
International Search Report and Written Opinion mailed Dec. 4, 2020 for corresponding International Application No. PCT/US2020/028286, 12 pages.
Translation of Japanese Office Action mailed Jan. 30, 2024 for JP Application No. 2022520301, 2 pages.
European Office Action mailed May 13, 2024 for EP Application No. 20724305.6, 5 pages.

* cited by examiner

NATURAL LANGUAGE DIALOG SYSTEM FOR COMPUTER PROGRAM INTERACTION

CROSS-REFERENCE TO RELATED APPLICATIONS

The present application is a U.S. National Stage under 35 U.S.C. § 371 of International Patent Application Serial No. PCT/US2020/028286, entitled "NATURAL LANGUAGE DIALOG SYSTEM FOR VIDEO GAME INTERACTION" and filed on 15 Apr. 2020, which claims priority to U.S. Provisional Application No. 62/988,942, entitled "NATURAL LANGUAGE DIALOG SYSTEM FOR VIDEO GAME INTERACTION" and filed on 13 Mar. 2020, the entireties of which are incorporated by reference herein.

BACKGROUND

A video game system, such as a computer, game console, smartphone, or game streaming system allows a user to interact with a virtual environment presented by a video game program. The user provides inputs to the system via a game controller or other input device, and in response the video game system updates a game state associated with the video game. Based on the game state, the video game system generates images representing the virtual environment for display and based on the displayed images the user provides additional input. Supporting relatively sophisticated or complex user inputs can therefore enhance the immersivity and enjoyability of the user experience with the video game. For example, some video games allow the user to interact with the virtual environment using dialog, such as allowing the user to interact with a game character by selecting from a menu of dialog options. However, existing techniques for supporting dialog interactivity in video games are limited, and in particular provide relatively few options for both dialog input and for responses by the video game.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

Figure 1:
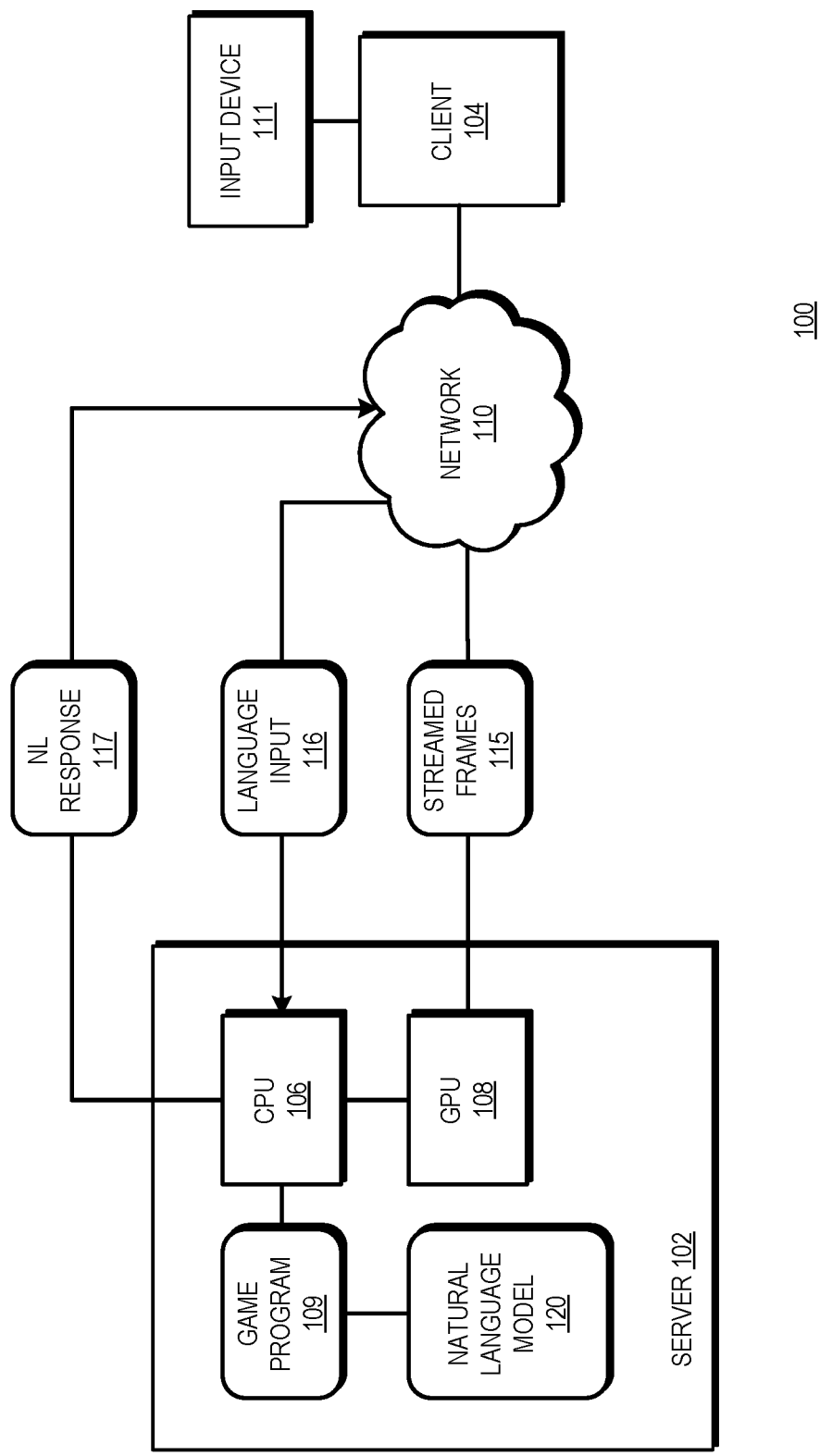
FIG. 1 is a block diagram of a game streaming system that employs a natural language model to select a dialog response for a video game in accordance with some embodiments.

FIGS. 1-5 illustrate techniques for providing dialog responses in a video game system based on natural language model (NLM). The NLM is a language model that receives a language input, such as a dialog selection, audio recording, or natural language text input provided by a user of the video game system. In response to the language input, and based on a corpus of natural language candidate lines, the NLM identifies one or more potential responses. The video game system selects a final response from the identified potential responses and provides the selected response to the user via, for example, one or more display frames or via an audio output. By using the NLM, the video game system is able to support both flexible language input and a relatively large variety of responses to the language input, thereby enhancing the developer's ability to create an immersive and enjoyable game, and allowing the user to interact with the game in a natural, unscripted way, thus improving the user experience.

To illustrate, dialog systems in conventional video games typically apply a rule-based approach, wherein the allowed language inputs and corresponding responses are defined by a set of rules. For example, in some video games, for a given interaction with the game the user is explicitly or implicitly only allowed to provide pre-defined language inputs, such as by selecting one of a set of language inputs provided by the video game itself, or by the video game providing a pre-defined response to an unexpected language input by the user. By restricting the allowed inputs to a relatively narrow range of pre-defined choices, the video game limits user creativity and expression. In addition, conventional video games typically provide, for each language input, a relatively small range of potential responses. These constraints can lead the user to have repetitive or otherwise limited interactions with the game, resulting in a poor user experience.

In contrast, the NLM dialog response techniques described herein support a much more flexible range of language inputs and corresponding candidate lines. For example, in some embodiments the NLM employs a natural language model that predicts, for a given natural language input and for each candidate line of a corpus of candidate lines (such as a set of potential responses to an input, or a set of candidate inputs with corresponding defined responses), the relative probability that a candidate line matches the input (that is, which of the candidate lines are more likely to be responsive than others. By accepting natural language input, the NLM allows the video game to implement more flexible approaches to dialog input, such as allowing the user to input audio information (e.g. speech) or text information that is not constrained by a limited set of rules defined by the video game.

In addition, the NLM is trained so that the match probabilities are higher for candidate lines that are expected to provide an immersive and satisfying user experience with the video game. For example, in some embodiments the NLM is implemented as a neural network that is trained using a defined set of inputs and expected responses, resulting in adjustment of the neural network's characteristics (e.g., the weights and edges of the neural network) so that the neural network provides match scores that result in a satisfying user experience. Accordingly, when the NLM is incorporated into a video game, the game receives language inputs from the player and provides responses that are unconstrained by a rigid set of response rules, thereby supporting more natural player interactivity with the video game.

In some embodiments, in response to a language input the NLM ranks a list of candidate lines, wherein the rank of each candidate line is based on the corresponding probability that the candidate line matches the language input. The video game selects a candidate line from the list based on specified selection criteria and provides a response based on the candidate line to the user. The selection criteria can include any of a number of factors and can be adjusted by a video game developer or the user to further enhance the user experience. For example, in some embodiments the video game can select the candidate line from the ranked list based on whether one or more of the ranked candidate lines has been used by the game recently, thereby reducing repetitive responses that can reduce game immersivity.

In some embodiments, the video game can select the candidate line based on a combination of metadata associated with each response and based on a game state of the video game. For example, each response can be assigned associated metadata, such as metadata indicating that a response should be excluded if a game character is located in a specified region of a game world. If the game state indicates that the game character is located in the specified region, the video game can exclude the response from being selected from the list created by the NL model.

In some embodiments, the NL model can operate in either of two different modes, an input/response mode and a semantic similarity mode, wherein each mode governs how the NL model identifies matches and how the game program uses the candidate lines. For example, in the input/response mode, each candidate line of a corpus can be a response, or portion of a response to be provided by the game program. The NL model receives a language input and, in response, accesses the corpus of responses to create a ranked list of responses based on the NL model's training. In the semantic similarity mode, the candidate lines can be expected language inputs, wherein metadata maps each expected language input to a corresponding response. In the semantic similarity mode, the NL model receives a language input and ranks the candidate lines based on the relative probability of each candidate line matching the language input. The game program selects a candidate line from the ranked list, and provides the response associated with the selected candidate line, as set forth in the corresponding metadata, to the user. In some embodiments, the operating mode of the NL model can be set by the video game based on a game state, allowing the model to be used in either of the two modes depending on the factors represented by the game state, such as a character location, a game progression, a time of day (either virtual or actual time of day), and the like, or any combination thereof.

FIG. 1 illustrates a game streaming system 100 that is generally configured to stream rendered game content from a server 102 to a client device 104, including dialog responses selected at least in part based on a natural language model (NLM) 120. It will be appreciated that although the NLM 120 is described with respect to the illustrated embodiment of the game streaming system 100, in other embodiments the techniques described herein using an NLM, such as the NLM 120, can be employed with any type of video game system, such as a game console, a desktop or laptop computer, a smartphone, a tablet, and the like.

In the depicted example, the server 102 and the client device 104 communicate via a network 110, wherein the network 110 is a packet-switched or other network that is generally configured to transfer data, including video data, via one or more routers, servers, communication towers (e.g. cellular communication towers), and the like, or any combination thereof. Accordingly, in various embodiments, the network 110 is a wide-area network (e.g., the Internet), a local-area network, and the like, or any combination thereof.

The server 102 and the client device 104 are generally configured to collectively implement a streamed game session wherein interactive game content is streamed from the server 102 to the client device 104. Accordingly, the server 102 can be any type of computer device that implements the functionality described further herein, such as a rack-mounted server, a cluster server (i.e. a server device implemented in a cluster of server devices), a mobile server device, and the like, or a combination thereof. The client device 104 can be any computer device that can display video frames to a user and can receive user input, and therefore can be a desktop or laptop computer, a digital media player, a game console, a smartphone, a tablet, and the like.

To support streaming of game content to the client device during a streamed game session, the server 102 includes a plurality of processing units, such as a central processing unit (CPU) 106 and a graphics processing unit (GPU) 108. The CPU 106 is a processing unit generally configured to execute general purpose sets of instructions, organized in the form of computer programs, to carry out tasks on behalf of the server 102. Examples of such computer programs include operating systems, virtual machines, data security programs (e.g. data encryption/decryption programs), web pages, database programs, and the like.

The GPU 108 is a processing unit generally configured to execute operations associated with graphics and vector processing based on commands received from the CPU 106. For example, in the course of executing one or more general purpose programs, the CPU 106 generates commands to generate and manipulate graphical models for display and provides the commands to the GPU 108. In response, the GPU 108 executes the commands by executing one or more corresponding graphical operations, thereby manipulating the graphical models to generate one or more frames for display. In some embodiments, the frames generated by the GPU 108 are rendered frames ready for display at a display device.

To support reception and display of streamed game content, the client device 104 includes a CPU and a GPU (not illustrated). Each of these modules is analogous to the corresponding module of the server 102. Thus, for example, the CPU of the client device 104 is generally configured to execute general-purpose instructions on behalf of the client device 104, such as executing one or more of an operating system, a web browser, and the like. It will be appreciated that, in some embodiments, the client device 104 generally has relatively small compute power relative to the server 102. The game streaming system 100 thus leverages the computing power of the server 102 to stream game content to the client device 104 that is of higher quality than can be generated by the client device 104 alone.

In operation, the client device 104 initiates a game streaming session in response to a user requesting the game session via a computer program (not shown) executed at the client device 104, such as via a web browser, a dedicated game streaming program, a video streaming service program, and the like. In response to the user request, the CPU 112 sends a game session request via the network 110 to the server 102. In response, the server 102 initiates execution of a game program 109. In some embodiments, the server 102 is configured to execute any one of a library of game programs, and the request provided by the client device 104 indicates the particular one of the game programs to be executed.

During execution, the game program 109 maintains a collection of data, referred to as a game state, that represents the condition, or state, of the game. A user of the client device 104 employs an input device 111 to provide input data to the CPU 112. The input device can be a keyboard, game controller, microphone, or other input device, or any combination thereof. The client device 104 communicates the input data to the game program 109 via the network 110. In response to the input data, the game program 109 modifies the game state according to the rules of the particular game implemented by the game program 109.

Based on the game state, and according to the rules of the implemented game, the game program 109 employs the CPU 106 and the GPU 108 to generate rendered frames, representing visual game information such as a virtual environment, a game board, a selection screen, a heads-up display (HUD) and the like, or any combination thereof. The server 102 provides these rendered frames, designated streamed frames 115, to the network 110 for communication to the client device 104. The client device 104 receives at least a subset of the streamed frames 115 and employs a GPU to display the received frames at a display (not shown). The client device 104 thus displays the visual game information to the user who, in response, uses the game controller or other input device to provide further input data, resulting in further changes to the game state maintained by the game program 109 and corresponding changes to frames of the frame stream 115. In this way, the user of the client device 104 interacts with the game program 109 to play the game executed at the server 102.

In some embodiments, in addition to the streamed frames 115, the server 102 provides audio data to the client device 104 via the network 110, wherein the audio data is generated by the game program 109 based on the game state. The audio data can be dialog, music, environmental sounds, and the like, or a combination thereof, and can include information that synchronizes the audio data with the streamed frames 115. The client device 104 receives the audio data and outputs the data via an audio rendering device (not shown), such as one or more speakers. In some embodiments, the client device 104 outputs the audio data based on the synchronization information provided by the server 102 so that the dialog, music, or other audio data is synchronized with displayed image frames.

In some embodiments, the user of the client device 104 can employ the input device 111 to provide a language input 116 to the game program 109. As used herein, a language input is any input that results in a dialog response from the game program 109. Accordingly, in different embodiments the language input 116 can be a natural language input, such as an audio file (e.g., an audio file representing one or more words spoken by the user into a microphone) that is converted to text via a, for example, speech to text (STT) function, a freeform text input (e.g., one or more words entered by the user via a keyboard), an input that is converted to a natural language input by a program executing at the client device 104 or the server 102, and the like. In other embodiments, the language input is an input from a game controller representing a specified game action, such as a selection of an option from a set of options displayed by the game program 109 via the streamed frames 115.

Responsive to the language input 116, the game program 109 employs the NLM 120 to select a natural language (NL) response 117. The NL response 117 can be text, audio, or other language information, or any combination thereof. In some embodiments, the NLM 120 provides the game program 109 embeddings for the language input 116, or provides a ranked list of candidate lines, as described further herein, and the game program 109 identifies the NL response 117 based on metadata associated with the embeddings or the selected candidate line. The server 102 communicates the NL response 117 to the client device 104, via the network 110, and the client device 104 provides the NL response 117 to the user, such as by playing the audio represented by the NL response 117.

The NLM 120 is a natural language model generally configured to provide, for a given language input, at least one corresponding response based upon a probability that the response matches the language input as indicated by the following expression:

$$P(LI|R)$$

where LI is the language input (e.g., language input 116), R is a response (e.g., a string of words), and P is the probability that the response matches the language input. In some embodiments, the NLM 120 is a statistical language model that uses statistical techniques such as n-grams, Hidden Markov Models (HMM), and the like, in conjunction with one or more linguistic rules to determine the probability that a given response matches a language input. Accordingly, the NLM 120 can be a unigram model, a bi-gram model, an N-gram model, an HMM model, and the like.

In other embodiments the natural language model is a neural network that has been trained, using a specified set of inputs and outputs (referred to as the training set), to determine probabilities that a response matches a language input. The training set is defined to include inputs that have a distribution of words, or word strings, that are expected to closely match the distribution of words, or word strings that are expected to compose the language inputs. The training set is further defined to include responses that are expected to be responsive to the distribution of language inputs. In some embodiments, the neural network adjusts one or more network characteristics (e.g., weights associated with nodes of the network) to map each input word or string to a vector representing a point in feature space. The neural network thus adapts to map a probability that a given language input corresponds to a given response, as indicated by the relationship, in the feature space, of the corresponding vectors (or sequence of vectors) for the language input and the response. In some embodiments, the NLM model 120 continues to adjust the characteristics of the neural network over time based on language inputs received from the game program 109. In some embodiments, the NLM 120 is a software program, a collection of one or more dedicated hardware circuits, such as a field programmable gate array (FPGA) or other hardware, configured to implement the NLM 120, or a combination thereof.

In operation, the game program 109 receives the language input 116 from the client device 104 and provides the language input 116 to the NLM 120. In response, the NLM 120 accesses a corpus (not shown at FIG. 1) of potential responses and determines, for each response in the corpus, a corresponding score indicating a relative probability that the response matches the language input 116. In some embodiments, the NLM 120 includes a number of corpora, and selects the corpus to use for matching based on the game state associated with the game program 109. For example, in some embodiments the game program 109 includes a different corpus for different game characters, and the game program 109 selects the corpus based on the character indicated by the same state.

In some embodiments, the NLM 120 creates, for each language input, a ranked list of matching candidates from the selected corpus, wherein the ranking for a given candidate is based on the probability, as determined by the NLM 120, that the candidate matches the language input. For example, the NLM 120 can assign scores with a linear relationship to the corresponding match probabilities of the responses, so that responses having a higher match probability are given a higher score, and therefore are ranked higher, than responses having a lower match probability. In some embodiments, the game program 109 excludes from the ranked list those candidates that have a corresponding score lower than a threshold value.

The game program 109 selects the NL response 117 from the ranked list provided by the NL model 120. In some embodiments, the game program 109 selects the NL response 117 based on one or more of the game state, metadata associated with the selected response, the frequency with which the selected response has been used, or other criteria. For example, in some embodiments the game program 109 selects the highest-ranking response that has not been used in the last N responses, where N is a programmable integer value. The game program 109 is thus able to increase variation in the responses provided to the user, improving the user experience.

Figure 2:
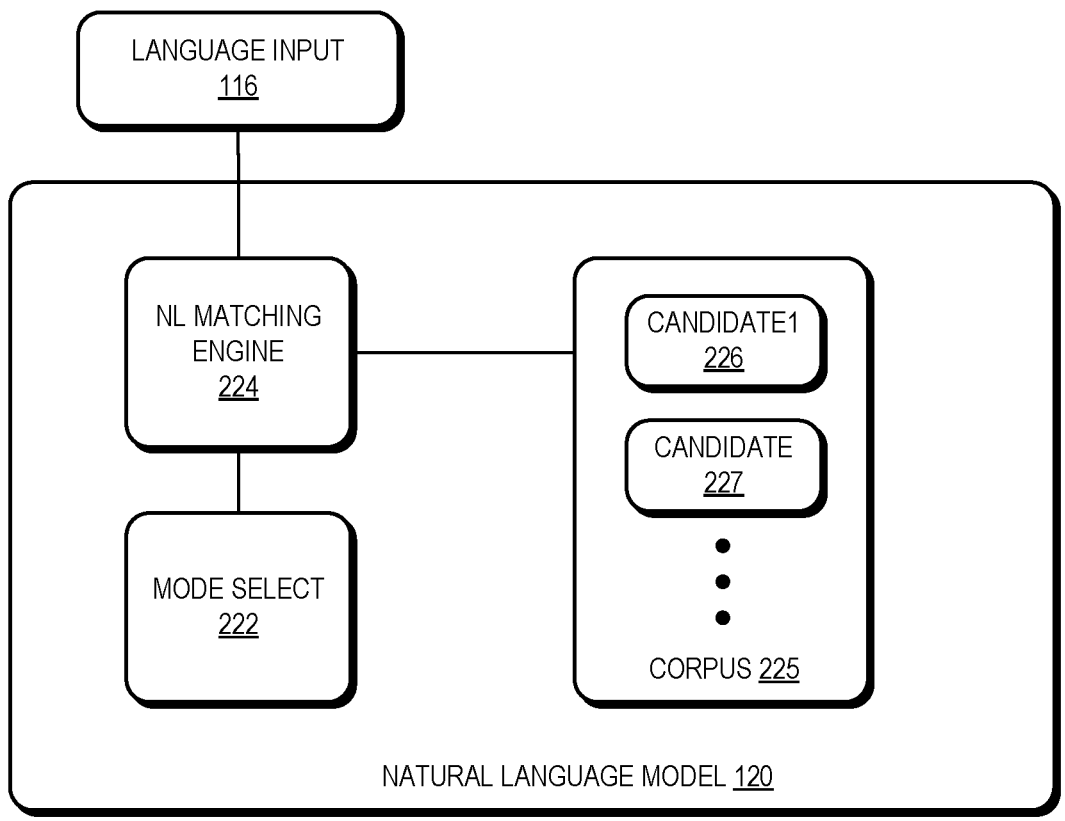
FIG. 2 is a block diagram illustrating an example of the natural language model of FIG. 1 in accordance with some embodiments.

FIG. 2 illustrates a block diagram of the natural language model 120 in accordance with some embodiments. In the depicted example, the NLM 120 includes a mode selection setting 222, a similarity engine 224, and a corpus 225, wherein the corpus 225 is provided by the game program 109. The corpus 225 includes a plurality of candidates (e.g. candidates 226, 227) for matching with a language input. In some embodiments, the game program 109 includes, or has access to, multiple corpora, and selects the corpus 225 based on a game state of the game implemented by the game program 109. The corpus 225 can therefore be selected based on any of a variety of criteria, such as a game character, game location, time of day (either in-game or real time), a game progression (e.g., how far a user has progressed in the game), and the like, or any combination thereof. The game program 109 is therefore able to identify responses that are tailored to the game state of the implemented game.

Figure 3:
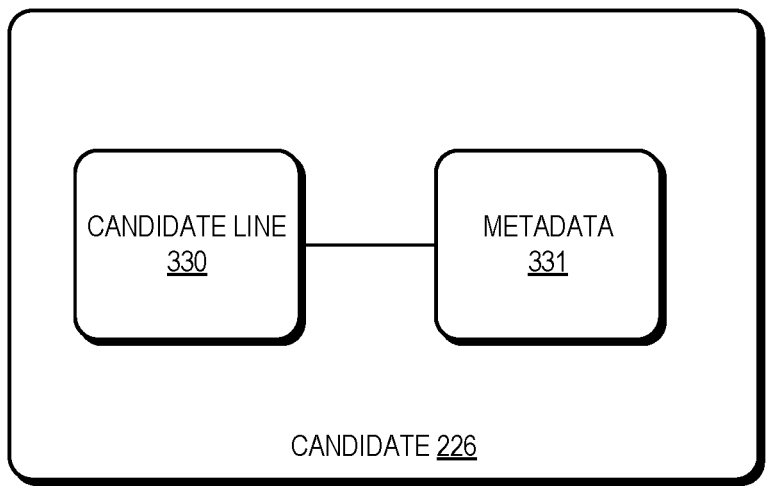
FIG. 3 is a block diagram of an example of a candidate line employed by a corpus of the natural language model of FIG. 2 in accordance with some embodiments.

With respect to the candidates included in the corpus 225, in some embodiments each candidate includes at least one candidate line and also includes metadata associated with the response. An example of the candidate 226 is illustrated at FIG. 3 in accordance with some embodiments. As illustrated, the candidate 226 includes a candidate line 330 and metadata 331. The candidate line 330 is a set of words or phrases, such as sentence, that NLM 120 uses to determine a match probability, and associated score, for the candidate 226 based on the language input 116. The candidate line 330 can be, for example, a set of words, phrases, or sentences to be spoken by an in-game character of the game program 109, or can be an expected language input to be used for semantic matching with the received language input 116.

The metadata 331 is data that is usable by the game program 109 to change the game state in response to selecting the candidate 226. For example, in some embodiments the metadata 331 includes one or more identifiers that map to corresponding data used by the game program to perform a response associated with the candidate 226, such as identifiers that map to audio data, image data, animation data, lip sync data, localization data, and the like. In some embodiments the metadata 331 includes text that is to be provided by the game program 109 in addition to or instead of the candidate line 330. This allows the game program 109 to match language inputs to candidates of the corpus 225 based on a relatively small portion of the overall response to be performed. For example, the NLM 120 can determine a match probability of the candidate 226 to the language input 116 based on the candidate line 330, and if the game program 109 selects the candidate 226, the game program 109 then displays for the user the additional text included in the metadata 331.

In some embodiments, the metadata 331 includes one or more fields that together define how the game program 109 is to use the candidate 226. Examples of these fields include one or more fields indicating how many times the candidate 226 is allowed to be selected by the game program 109 from the ranked list in a specified amount of time (e.g., number of times per hour, per game session, per year, and the like), one or more fields indicating whether the game program is allowed to consecutively select the candidate 226 (thereby allowing or preventing repeated consecutive uses of the candidate 226), one or more fields indicating how the game state for the game implemented by the game program 109 is to be changed if the candidate 226 is selected, and the like.

In some embodiments, the game program 109 can change one or more fields of the metadata 331 based on the game state, allowing the metadata 331 to dynamically reflect changing game conditions. For example, in some cases the game program 109 can modify the metadata 331 to allow a candidate 226 to be selected more often if the game state indicates that a user's character is in a crowd or other area of the game environment where repetitive responses are more likely.

Returning to FIG. 2, the NL matching engine 224 is software, hardware, or combination thereof, that determines a corresponding match probability for each of the candidates of the corpus 225 based on the language input 116. Accordingly, the NL matching engine 224 can be a neural network implemented in hardware or software, or a combination thereof, hardware or software (or a combination thereof) configured to implement a statistical language model, and the like. In some embodiments, the NL matching engine 224 can operate in either of two different modes, wherein the mode is governed by the mode selection setting 222, which can be a flag, a register or portion thereof (e.g., a portion of a configuration register for the NLM 120), or any other programmable storage module that can store data indicative of a setting.

The two modes of the NLM 120 are referred to herein as an input/response mode and a semantic similarity mode, respectively. In the input/response mode, the candidates of the corpus 225 include all possible responses by the game program 109 to the language input 116, and the NL matching engine 224 determines, for each candidate, a corresponding probability that the candidate matches the received language input 116 (that is, the relative probability that the candidate is responsive to the language input 116). The NL matching engine creates a ranked list of the potential candidates based on the probabilities, and the game program 109 selects the NL response 117 based on the ranked list.

In the semantic similarity mode, the candidates of the corpus 225 are expected or potential language inputs, and the NLM 120 identifies a semantic similarity with the language input 116 for each of the candidates of the corpus 225. The semantic similarity mode can be used to provide more control to, for example, a developer of the game program 109. For example, in some embodiments the game program 109 includes a mapping between the anticipated language inputs and responses and stores the anticipated language inputs in the corpus 225. In response to receiving the language input 116, the NLM 120 creates a ranked list of the anticipated inputs from the corpus, the rankings based on the probability that each anticipated input semantically matches the language input 116. The game program 109 selects one of the anticipated inputs from the ranked list and uses the mapping to determine the response to be provided to the user.

Figure 4:
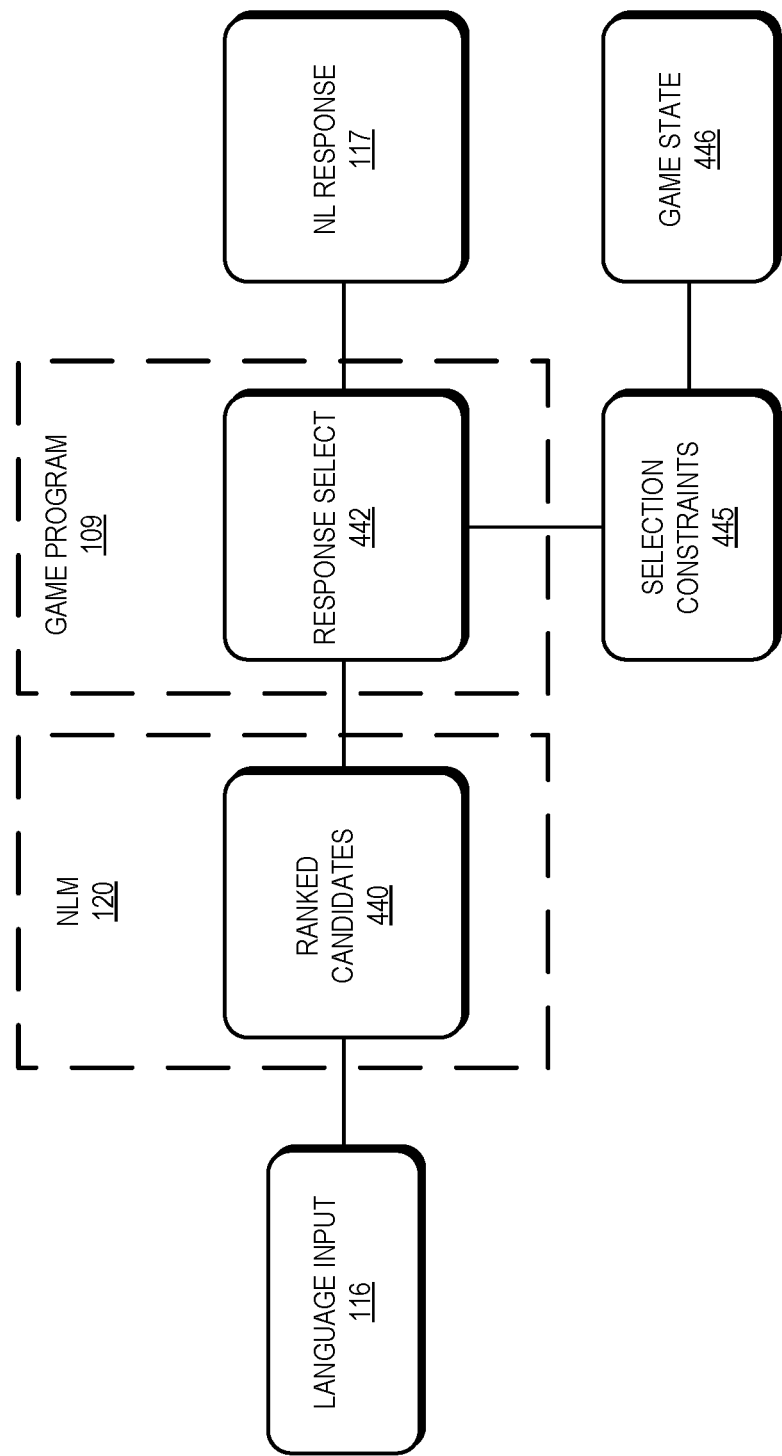
FIG. 4 is a diagram illustrating an example of the natural language model of FIG. 1 creating a dialog response for the video game in accordance with some embodiments.

FIG. 4 illustrates an example of the game streaming system 100 generating the NL response 117 in accordance with some embodiments. In the depicted example, the NLM 120 receives the language input 116. In different embodiments, the language input 116 is based on any of a variety of input types provided by the user via the input device 111 (FIG. 1), such as selection of a dialog option using a joystick, mouse, or gamepad, freeform text entered via a keyboard or via voice recognition, speech recorded via a microphone, and the like. Further, in some embodiments the language input 116 is a natural language input and is therefore not constrained by pre-defined dialog options or restrictive dialog rules imposed by the game associated with the game program 109.

Based on the language input 116, the NL model 120 creates a ranked list 440 of candidates from the corpus 225 (FIG. 2). In some embodiments, the NLM 120 determines the probability that each candidate of the corpus 225 matches the language input 116 and ranks the candidates in the ranked list 440 based on the identified possibilities. In some embodiments, the game program 109 omits or prunes from the ranked list 440 any responses with a corresponding match probability that is below a threshold.

The game program 109 employs a response select module 442 to select a candidate from the ranked list 440 t. Based on the selected candidate, the game program 109 determines and provides the NL response 117. For example, in some embodiments each candidate includes or identifies associated metadata that identifies a corresponding response. In response to selecting a candidate, the game program 109 uses the metadata associated with the candidate to determine the corresponding response, and provides the response as the NL response 117.

In some embodiments, the response select module 442 is a software module that is a portion of the game program 109. The response select module 442 selects a candidate from the ranked list 440 based on a set of selection constraints 445. In some embodiments, the selection constraints 445 are constraints that are developed and defined during development of the game program 109. In other embodiments, the selection constraints 445 are programmable constraints that can be adjusted by the developer, by the user, or both. In either case, the selection constraints 445 can be stored as configuration data for the game program 109.

The selection constraints 445 govern how the response select module 442 selects a candidate from the ranked list 440. Accordingly, the selection constraints 445 can exclude candidates from selection, can change the ranking of candidates, change how the rankings are used by the response select module 442 (so that, for example, a candidate with a lower ranking on the list is selected over a response with a higher ranking), and the like, or any combination thereof. In addition, in some embodiments the selection constraints 445 can change based on a game state 446 representing the current state of the game associated with the game program 109. Thus, the game state 446 can indicate state information such as character locations, character progression states (e.g., a character level, character equipment, and the like), game progression states (e.g., a current level of the game), a number of times that the game has been played or completed, response states (e.g., the number of times a given response has been provided to the user, a frequency with which a given response has been used, which game characters have used a given response, and the like).

The selection constraints 445 establish a set of rules for the response select module 442 to use when selecting a candidate. To illustrate via an example, in some embodiments the selection constraints indicate that a response, designated RESPONSE A, is not to be repeated during a given game session. If the response select module 442 determines that the candidate associated with RESPONSE A is the top ranked candidate in the ranked list 440, the response select module 442 next determines (e.g., based on the game state 446) whether RESPONSE A has been provided to the user during the current game session. If not, the response select module 442 selects the candidate associated with RESPONSE A and provides RESPONSE A as the NL response 117. If the response select module 442 determines that RESPONSE A has been provided to the user during the current game session, the response select module 442 selects another candidate from the ranked list 440, and provides the associated response as the NL response 117.

The selection constraints 445 can provide a way for a developer or user of the game program 109 to exclude specified responses, or types of responses, from selection by the game program 109, thereby providing a way to tune the user experience with the associated game. For example, if a developer determines that a particular response is inconsistent with a desired game experience, the developer can set the selection constraints 445 so that the candidate associated with the response is excluded from selection by the response select module 442. The developer thus adjusts the game experience while preserving the corpus 225.

Figure 5:
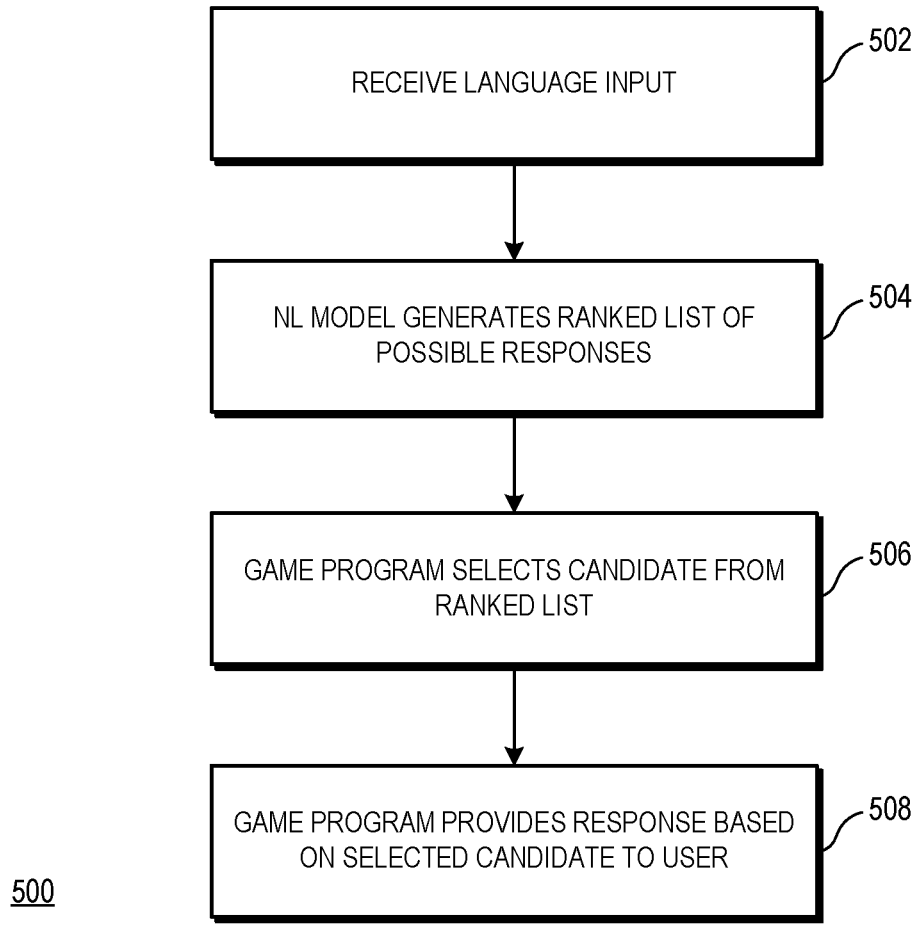
FIG. 5 is a flow diagram of a method of creating a dialog response for a video game using a natural language model in accordance with some embodiments.

FIG. 5 is a flow diagram of a method 500 of generating a dialog response for a video game using a natural language model in accordance with some embodiments. For purposes of description, the method 500 is described with respect to an example implementation at the game streaming system 100 of FIG. 1. At block 502, the server 102 receives the language input 116. In some embodiments, the language input 116 is identified at the client device 104 based on a user input provided via the input device 111, and the client device 104 provides the language input 116 to the server 102 via the network 110.

At block 504, the game program 109 provides the language input 116 to the NLM 120, and in response the NLM 120 creates the ranked list 440 of candidates. To create the ranked list 440, the NLM 120 determines the relative probability that each candidate of the corpus 225 matches the language input 116 and ranks the responses in the ranked list 440 based on the identified probabilities. At block 506, the response select module 442 selects a candidate from t from the ranked list 440 based on the selection constraints 445. At block 508, the game program 109 identifies the NL response 117 based on the selected candidate, and provides the identified NL response 117 to the client device 104 via the network 110. In response, the client device 104 provides the NL response 117 to the user by, for example, displaying the NL response 117 on a display, playing the NL response 117 via a speaker, or any combination thereof.

In some embodiments, certain aspects of the techniques described above may be implemented by one or more processors of a processing system executing software. The software comprises one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpretable or otherwise executable by one or more processors.

A computer readable storage medium may include any storage medium, or combination of storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

In the following some embodiments are described as examples.

Example 1: A method comprising:
based on a language input received from a video game, determining a first response with a natural language model; and
providing the first response to a user via the video game.

Example 2. The method of example 1, wherein determining the first response comprises:
determining, with the natural language model, a match probability between the language input and a first candidate of a plurality of stored candidates, each candidate corresponding to a potential response; and
determining the first response based on the first candidate.

Example 3. The method of example 2, wherein determining the match comprises determining the match based on the language input and a specified constraint for the plurality of stored candidates.

Example 4. The method of example 2 or 3, wherein determining the match comprises:
determining a ranked list of the plurality of stored candidates based on the natural language model and the language input; and
selecting the first candidate from the ranked list based on the specified constraint.

Example 5. The method of at least one of the examples 2 to 4, wherein determining the match comprises determining the match based on a game state of the video game.

Example 6. The method of at least one of the examples 2 to 5, wherein determining the match comprises determining the match based on a previous response identified based on the natural language model.

Example 7. The method of at least one of the preceding examples, further comprising determining the language input based on an audio input to the video game.

Example 8. The method of at least one of the preceding examples, further comprising determining the language input based on a user dialog selection provided to the video game.

Example 9. A method, comprising:
receiving a language input from a video game;
determining, based on a natural language model, a ranked list of a plurality of candidates associated with a corresponding plurality of natural language responses; and
providing a selected response based on the ranked list via the video game.

Example 10. The method of example 9, wherein determining the ranked list comprises:
determining, with the natural language model, a match probability with the language input for each of the plurality candidates; and
determining the ranked list based on each determined match probability.

Example 11. The method of example 10, wherein determining the match probability comprises determining a semantic similarity probability.

Example 12. The method of example 9, wherein the language input is a natural language input.

Example 13. A non-transitory computer readable medium embodying a set of executable instructions, the set of executable instructions to manipulate a processor to:
based on a language input received from a video game, determine a first response with a natural language model; and
provide the first response to a user via the video game.

Example 14. The computer readable medium of example 13, wherein the instructions to determine the first response comprise instructions to:
determine, with the natural language model, a match probability between the language input and a first candidates of a plurality of stored candidates; and
determine the first response based on the first candidate.

Example 15. The computer readable medium of example 14, wherein the instructions to determine the match comprise instructions to determine the match based on the language input and a specified constraint for the plurality of stored candidates.

Example 16. The computer readable medium of example 15, wherein the instructions to determine the match comprise instructions to:
determine a ranked list of the plurality of stored candidates based on the natural language model and the language input; and
select the first candidate from the ranked list based on the specified constraint.

Example 17. The computer readable medium of example 15 or 16, wherein the instructions to determine the match comprise instructions to determine the match based on a game state of the video game.

Example 18. The computer readable medium of at least one of the examples 14 to 17, wherein the instructions to determine the match comprise instructions to determine the match based on a previous response identified based on the natural language model.

Example 19. The computer readable medium of at least one of the examples 13 to 18, wherein the set of executable instructions include instructions to determine the language input based on an audio input to the video game.

Example 20. The computer readable medium of at least one of the examples 13 to 19, wherein the set of executable instructions include instructions to determine the language input based on a user dialog selection provided to the video game.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A method comprising:
   based on a language input received from a computer program, determining a first response with a natural language model from a plurality of stored candidates and selecting a first candidate of the plurality of stored candidates based on the first candidate being unused within a defined number of previous responses used in the computer program; and
   providing the first response to a user via the computer program.

2. The method of claim 1, wherein determining the first response comprises:
   determining, with the natural language model, a match probability between the language input and a first candidate of a plurality of stored candidates, each candidate corresponding to a potential response; and
   determining the first response based on the first candidate.

3. The method of claim 2, wherein determining the match probability comprises determining the match probability based on the language input and a specified constraint for the plurality of stored candidates.

4. The method of claim 3, wherein determining the match probability comprises:
   determining a ranked list of the plurality of stored candidates based on the natural language model and the language input; and
   selecting the first candidate from the ranked list based on the specified constraint.

5. The method of claim 2, wherein the computer program comprises a video game, and wherein determining the match probability comprises determining the match probability based on a game state of the video game.

6. The method of claim 2, wherein determining the match probability comprises determining the match probability based on a previous response identified based on the natural language model.

7. The method of claim 1, further comprising determining the language input based on an audio input to the computer program.

8. The method of claim 1, further comprising determining the language input based on a user dialog selection provided to the computer program.

9. A method, comprising:
   receiving a language input from a computer program;
   determining, based on a natural language model, a ranked list of a plurality of candidates associated with a corresponding plurality of natural language responses; and
   providing a selected response based on the ranked list via the computer program, based on the selected response being unused within a defined number of previous responses used in the computer program.

10. The method of claim 9, wherein determining the ranked list comprises:
    determining, with the natural language model, a match probability with the language input for each of the plurality of candidates; and
    determining the ranked list based on each determined match probability.

11. The method of claim 10, wherein determining the match probability comprises determining a semantic similarity probability.

12. The method of claim 9, wherein the language input is a natural language input.

13. A non-transitory computer readable medium embodying a set of executable instructions, the set of executable instructions to manipulate a processor to:
    based on a language input received from a computer program, determine a first response with a natural language model based on a first candidate of a plurality of stored candidates, wherein the first candidate is selected based on the first candidate being unused within a defined number of previous responses used in the computer program; and
    provide the first response to a user via the computer program.

14. The computer readable medium of claim 13, wherein the instructions to determine the first response comprise instructions to:
    determine, with the natural language model, a match probability between the language input and the first candidate of the plurality of stored candidates.

15. The computer readable medium of claim 14, wherein the instructions to determine the match probability comprise instructions to determine the match probability based on the language input and a specified constraint for the plurality of stored candidates.

16. The computer readable medium of claim 15, wherein the instructions to determine the match probability comprise instructions to:
    determine a ranked list of the plurality of stored candidates based on the natural language model and the language input; and
    select the first candidate from the ranked list based on the specified constraint.

17. The computer readable medium of claim 15, wherein the computer program comprises a video game, and wherein the instructions to determine the match probability comprise instructions to determine the match probability based on a game state of the video game.

18. The computer readable medium of claim 14, wherein the instructions to determine the match probability comprise instructions to determine the match probability based on a previous response identified based on the natural language model.

19. The computer readable medium of claim 13, wherein the set of executable instructions include instructions to determine the language input based on an audio input to the computer program.

20. The computer readable medium claim 13, wherein the set of executable instructions include instructions to determine the language input based on a user dialog selection provided to the computer program.

* * * * *